னoted July 2, 1963

3,096,366
PREPARATION OF TEREPHTHALIC ACID BY CARBOXYLATION REACTIONS
Franklin D. Smith, Webster Groves, Mo., and Erhard J. Prill, James C. Wygant, and Milton Kosmin, Dayton, Ohio, assignors, by mesne assignments, to Henkel and Cie G.m.b.H., a corporation of Germany
No Drawing. Filed Oct. 7, 1957, Ser. No. 688,785
10 Claims. (Cl. 260—515)

The present invention is directed to the preparation of terephthalic acid by the thermal reaction of alkali metal benzoates and alkali metal salts of organic carboxylic acids.

It has previously been reported that potassium benzoate can be converted to potassium terephthalate by heating at high temperature under carbon dioxide pressure. The present invention makes it possible to improve the yields over those of the foregoing reaction by providing a reactant capable of donating carboxyl groups to the benzoate reactant.

Organic carboxylic acid as used herein refers to a compound containing a carboxyl group attached to an organic residue by a carbon-to-carbon bond, i.e., the acid must have at least two carbon atoms; the organic carboxylic acid is utilized in salt form, and, of course, it is contemplated as being an acid other than the benzoic acid reactant.

The preparation of terephthalates by heating benzoic acid alone can be represented by the following equation:

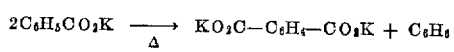

$$2C_6H_5CO_2K \xrightarrow{\Delta} KO_2C-C_6H_4-CO_2K + C_6H_6$$

Thus, a 100% yield and conversion calculated according to the foregoing disproportionation equation really represents conversion of only 50% of the benzoate salt to the terephthalate salt. The use of an organic carboxylic acid salt as additional reactant provides a source of carboxyl groups, and leads to the production of more terephthalate and less benzene. The use of the organic carboxylic acid salt is desirable so long as it improves the actual conversion of the benzoate to terephthalate under the reaction conditions being utilized; however, the advantage of the organic carboxylic acid salt is most readily apparent in cases where it increases the actual conversion of the benzoate to the terephthalate to values higher than 50%, as this result could not possibly be attained by disproportionation of the benzoate alone.

In the examples set forth herein, the yields are usually calculated on the basis of a disproportionation reaction in order to afford a basis of comparison with the foregoing benzoate disproportionation; it is apparent, however, that other reactions are involved, as the yield is often over 100% when calculated as a simple disproportionation.

The alkali metal benzoates for use in the present process can be any alkali metal benzoates capable of disproportionation to terephthalates. The heavier alkali metal benzoates are suitable, i.e., benzoates of alkali metals having an atomic weight of at least 39, e.g., potassium, rubidium, and cesium. If one of these heavier alkali metal benzoates is present, other alkali metal benzoates can be converted to terephthalic acid to some extent; for example, if a substantial part of the benzoate salt is potassium benzoate, the rest can be the sodium salt. A mixture of the cationic components of the benzoate can be obtained by neutralizing benzoic acid with a mixture of bases; for example, benzoic acid can be neutralized with Tronacarb. Tronacarb is the trademark name applied to the mixture of carbonate salts obtained as a by-product in the production of lithium from lepidolite. The carbonate mixture contains about 27% rubidium carbonate, about 70% potassium carbonate, and minor amounts of cesium and other metal carbonates.

The alkali metal in the alkali metal organic carboxylic acid salt reactant can be any alkali metal suitable for use in the alkali metal benzoate as described above. Moreover, if all or a substantial part of the alkali metal in the benzoate salt reactant is of atomic weight of at least 39, all or part of the alkali metal in the organic carboxylic acid salt reactant can be alkali metal of lesser atomic weight; similarly, if a substantial part of the organic carboxylic acid salt reactant is formed from the heavier alkali metals, all or part of the benzoate salt can contain the lighter alkali metals.

Heavy metal catalysts are useful in promoting the present process for preparing terephthalic acid. The heavy metals can be used, for example, in their metallic, oxide, or salt forms. The heavy metals are the group of metals so designated in the periodic chart of the elements (see Lange's Handbook of Chemistry, Sixth Edition, 1946, pages 58 and 59); for example, aluminum, chromium, titanium, vanadium, manganese, iron, cobalt, nickel, copper, zinc, molybdenum, silver, cadmium, tin, antimony, tungsten, mercury, lead, bismuth, etc. Any of the heavy metals can be used as free metals, or in the form of their salts or oxides. As oxides, mono-, di-, tri-, sesqui-, sub-, or whatever oxide forms the metal may exist in are suitable. In the salts, the anions may be from any salt-forming acid so long as the salts which are formed will not unduly interfere in the reaction or contaminate the product. Such common inorganic anions as, for example, $CO_3^-$, $Cl^-$, $F^-$, $Br^-$, $PO_4^{-3}$, etc. form heavy metal salts which will suitably catalyze the conversion to terephthalates. It is also possible to use the heavy metal salts of organic acids, for example, of such acids as acetic acid, propionic acid, benzoic acid, etc. As examples of particular salts which catalyze the reaction very effectively, there are cadmium carbonate, cadmium chloride, zinc carbonate, zinc chloride, lead carbonate, lead chloride, etc. Cadmium compounds, for example, cadmium in the form of its salts, oxides, or in the free metal form, are particularly effective in the reaction of the present invention. When the heavy metal catalysts are referred to herein, either generically or individually, it will be understood that the salt and oxide forms are contemplated as well as the free metals.

Any significant amounts of the heavy metal catalysts will be helpful in causing conversion of the organic carboxylate and benzoate salt mixture to terephthalates. Amounts of the catalysts of from about 1% to 20% by weight, based on the aromatic acid salts, will generally be used; amounts of 2% to 10%, for example, 5%, are very satisfactory.

The use of such heavy metal catalysts makes it possible to utilize any alkali metal salts of the organic carboxylic acids and benzoic acid in the present process. Of course, it is ordinarily preferred that only the heavier alkali metal salts be utilized as the results are better, but there may at times be an advantage in the use of all or part of either or both salt components in the form of sodium salts.

Temperatures in the present process are such as to cause reaction at a substantial rate without causing degradative pyrolysis of the hydrocarbon structure. Temperatures of the order of, for example, about 400° to 500° C. are ordinarily required. At temperatures substantially below 400° C., for example, below about 350° C., the reaction does not ordinarily occur at practicable rates, while use of temperatures above 500° C. can cause degradation of the benzene ring. However, in some cases, it will probably be feasible to utilize temperatures outside the above range by use of special conditions. Temperatures in the range of 400° to 475° C. will generally be used. The double decomposition of organic carboxylate and benzoate salts to terephthalate salts can take place under autogenous pressure, or under pressure of external gases, e.g., at such superatmospheric pressures as about 1000 to 5000 pounds/square inch. It is advantageous, of course, to exclude oxygen or other reactive gases from the reactor; this can be suitably accomplished by merely flushing the reactor with nitrogen or other inert gas prior to the reaction period; such gases as carbon dioxide, carbon monoxide, hydrocarbons such as methane, etc., are inert gases in this reaction. It would also be possible to conduct the reaction at pressures somewhat less than the autogenous pressure by providing for partial venting of the reaction chamber by means of some type of pressure-release valve.

The reaction time should ordinarily be sufficient to cause reaction of substantially all the benzoate salt reactant. The optimum reaction time will vary inversely with the reaction temperature and will also vary to some extent with heat transfer and other conditions of the reaction system. In the reactor described herein, reaction times of about 1 to 20 hours or more are satisfactory, but longer or shorter times can be used. Reaction times of the order of 3 to 15 hours are generally employed. While the reaction can be conducted satisfactorily with no materials other than reactants and catalyst, various other materials can be present as reaction promoters, modifiers, etc., or as heat transfer media or diluents. For example, it would be possible to use sand or the like as a heat transfer medium. If it were desired to agitate the reactants, or to transport the reactants in some type of continuous process, it might be advisable to employ a liquid diluent of some kind, e.g., some inert hydrocarbon such as diphenyl or some other material which would not affect the course of the reaction, or decompose to any great extent under the reaction conditions to contaminate the product.

*Example 1*

A bomb was provided with a 10-inch stainless steel rack supporting 12 small glass dishes or trays (1¼" diameter by ½" deep) at equally spaced levels. A mixture of 0.025 mole potassium benzoate and 0.075 mole dipotassium oxalate, containing 5% by weight of cadmium carbonate, was placed in the dishes. The bomb was then pressured to 850 p.s.i. with carbon dioxide and inserted in a sodium, potassium, lithium nitrate bath which had been heated to 175° C. The temperature was raised to 440° C. in about 2 hours and maintained there for 12 hours, the maximum pressure being 2500 p.s.i. The bomb was cooled to 175° C., vented and opened. The solid material in the trays was dissolved in 75 ml. water and filtered. The filtrate was acidified with dilute hydrochloric acid, and the resulting precipitate was collected by filtration and treated with 50 ml. boiling water. The terephthalic acid solids were collected, washed with boiling water, and dried to 2.4 grams, for a 116% yield calculated as a disproportionation reaction; (if considered as a carboxylation of benzoic acid, the yield is 58% of theory based on the amount of benzoate reactant).

*Analysis.*—Calculated for terephthalic acid: neutral equivalent, 83. Found: neutral equivalent, 83.57.

It is apparent from the above yield figures that the presence of an oxalic acid salt gives yields which would be impossible in the absence of carboxyl group donation.

When potassium formate was substituted for potassium oxalate in the above procedure, the yield at 450° was only 62.8% calculated as a disproportionation; this is lower than it would be without the formation; the yield in the presence of formate at 425° was 12%; and at 400° C. no terephthalate was produced and practically all of the benzoate was recovered as benzoic acid.

*Example 2*

A bomb was provided with a 10-inch stainless steel rack supporting 12 small glass dishes or trays (1¼" diameter by ½" deep) at equally spaced levels. A mixture of 0.02 mole potassium benzoate and 0.02 mole tripotassium trimellitate, containing 5% by weight of cadmium carbonate, was placed in the dishes. The bomb was then pressured to 850 p.s.i. with carbon dioxide and inserted in a sodium, potassium, lithium nitrate bath which had been heated to 175° C. The temperature was raised to 440° C. in about two hours and maintained there for 12 hours, the maximum pressure being 2500 p.s.i. The bomb was cooled to 175° C., vented and opened. The material in the trays was dissolved in 75 ml. of water and filtered. The filtrate was acidified with dilute hydrochloric acid, and the resulting precipitate was collected by filtration and treated with 125 ml. boiling water. The terephthalic acid solids were collected and dried to 5.05 grams for a 76.1% yield based on the 0.04 mole of reactants (0.02 mole each of the benzoate and trimellitate salts). The conversion was also 76.1%.

*Analysis.*—Calculated for terephthalic acid: neutral equivalent, 83. Found: neutral equivalent, 82.71.

Infrared analysis indicated the compound to be terephthalic acid.

The best results which could be expected from heating comparable amounts of the reactants separately under these conditions would be about 90% disproportionation of the benzoate (actual conversion of 45% of the benzoate to the terephthalate), and 80% decarboxylation of the trimellitate to the terephthalate, to produce a total or 4.2 grams terephthalic acid for a yield of 63.2%.

The temperature in the above example was determined by two thermocouples, one located near the top and one near the bottom of the outside of the bomb; it had previously been shown that these thermocouple temperatures corresponded very closely to internal temperatures in the bomb.

*Example 3*

Utilizing the apparatus described in Example 1, 7.4 grams of a 1:1 molar mixture of potassium benzoate and dipotassium oxalate (0.0214 mole of each) containing 5% by weight of cadmium carbonate was plated in trays and heated at 440° C. under 2100 p.s.i. of carbon dioxide for 12 hours. The reaction product, which weighed 6.2 grams, was treated according to the procedure of Example 1 to give 1.8 grams of terephthalic acid, for a 101% yield, calculated as a disproportionation reaction.

*Example 4*

The procedure of Example 1 was repeated but with 0.0375 mole of potassium benzoate admixed with 10 molar percent of dipotassium oxalate and in the absence of cadmium carbonate or other heavy metal compound. The material was heated at 450° C. under 2400 p.s.i. carbon dioxide for 12 hours. The yield of terephthalate was 93.2%; apparently there was not sufficient oxalate salt to have a strong carboxyl donating effect.

*Example 5*

The procedure of Example 1 was repeated, except that no cadmium carbonate or other heavy metal catalyst was utilized. The yield of terephthalic acid was 94%. While this yield is not high enough to positively indicate carboxyl group donation by the oxalate, it is notable that it is much higher than would ordinarily be obtained in the absence of cadmium or other heavy metal catalyst.

*Example 6*

A mixture of 0.025 mole potassium benzoate and 0.075 mole potassium acetate containing 5% by weight of cadmium carbonate was heated at 375° C. under 2500 p.s.i. of carbon dioxide for 12 hours. The material was then treated according to the procedure of Example 1 to give 2.3 grams of terephthalic acid for a yield of 110.8%, calculated as a disproportionation reaction (the yield would be 55.4% on the basis of a carboxylation reaction). It is clear that the potassium acetate caused some carboxylation of the benzoate to the terephthalate.

When the procedure of the above example was repeated, but with potassium carbonate in place of potassium acetate, and with a small amount of calcium hydride in the trays between those containing the reactants, the yield of terephthalic acid was only 28.8% (calculated as a disproportionation); when the calcium hydride was omitted, the yield was still low, being 69.4% (as a disproportionation).

*Example 7*

A mixture containing 0.02 mole each of dipotassium maleate and potassium benzoate, 0.06 mole of potassium acetate and 5% by weight of cadmium carbonate was heated at 375° C. under 2500 p.s.i. of carbon dioxide for 12 hours. The product was worked up according to the procedure of Example 1 to give 2.05 grams of terephthalic acid, for a yield of 123.6%, calculated as a disproportionation reaction (61.8% based on the benzoate and assuming metathetical reaction between the benzoate and the other organic carboxylic acid salts). Comparable results can be obtained by substituting dipotassium fumarate for the maleate in this procedure.

*Example 8*

A mixture of 0.02 mole of potassium benzoate and 0.02 mole of tripotassium trimesate was placed in the odd-numbered trays and a mixture of 0.03 mole of potassium benzoate and 0.015 mole tripotassium pyromellitate was placed in the even trays; in addition, each mixture contained about 5% by weight of cadmium carbonate. The rack containing the trays was inserted into the bomb, and the bomb was heated to 450° C. for 12 hours; the carbon dioxide pressure was 2300 p.s.i. The material from the trays which had contained trimesate reactant was worked up according to the procedure of Example 1 to give 3.95 grams terephthalic acid, as confirmed by infrared analysis and neutral equivalent. The yield was 238%, calculated as a disproportionation reaction of the benzoate reactant; (119% as a carboxylation of the benzoate reactant, 59.5% as a metathetical reaction, with both reactants being converted to terephthalic acid).

Upon working up the product of the pyromellitate reaction by following the procedure of Example 1, a 3.3-gram amount of terephthalic acid was obtained; infrared analysis and the neutral equivalent confirmed the terephthalic acid structure. This is a 130.6% yield, calculated on the basis of disproportionation of the benzoate reactant; (44.2% calculated as a metathetical reaction and with the product from the pyromellitate being converted to terephthalic acid).

*Example 9*

A 4.9-gram amount (3 gram-equivalents) of the potassium salt of coal acids containing 5% by weight of cadmium carbonate was placed in the odd trays, and a mixture of 0.01 mole potassium benzoate and 0.03 gram-equivalents (3.7 grams) of the potassium salt of coal acids containing 5% by weight of cadmium carbonate was placed in the even trays. The reactants were heated in the bomb at 440° C. under 2500 p.s.i. of carbon dioxide for 12 hours. Upon treating the product from the reaction of the coal acid salts alone according to the isolation procedure of Example 1, only a trace of insoluble acid product was obtained; this indicates that the coal acids themselves are not converted to terephthalic acids. The material from the even trays was dissolved in 40 ml. water and filtered; the dark filtrate was acidified to cause evolution of carbon dioxide and formation of a precipitate which was collected, boiled up with 50 ml. of water, and filtered. The weight of the terephthalic acid product was 1.65 grams, for a yield of 198.6% based on disproportionation of the benzoate (99.3% calculated as a carboxylation reaction and based on benzoate reactant).

The coal acids utilized in salt form in the above procedure were obtained by oxidizing coal with air in the presence of caustic soda and comprising polycarboxy aromatic acids such as isophthalic, terephthalic, trimellitic, and pyromellitic acids and pentacarboxy benzene.

For the carboxyl donating organic acid to be used in the form of a salt in the present process, any carboxylic acid as represented by the structure:

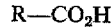

R—CO$_2$H is satisfactory; R represents an organic residue bound to the carboxyl group by a covalent carbon-to-carbon bond. It is necessary to have such a residue, presumably because an intermediate of the type KR is effective in causing metal substitution in the benzoate ring prior to the carboxylation thereof by a carboxyl group. Thus, such compounds as $K_2CO_3$ and $HCO_2K$ are not organic carboxylic acid salts as contemplated herein as they do not contain the organic residue and are not effective in causing carboxylation according to the process of the present invention. The salts of aliphatic carboxylic acids containing at least two carbon atoms are suitable carboxylating agents for use in the present invention; for example, the salts of the aliphatic carboxylic acids containing 2 to 6 carbon atoms, such as the acids represented by the above formula when R is an alkyl group of 1 to 5 carbon atoms; or the dicarboxylic acids in which the carboxyl groups are separated by 0 to 4 carbon atoms, any such carbon atoms preferably being in a saturated or unsaturated hydrocarbon group. While the higher aliphatic acids are also effective, it is usually desirable for economic reasons to utilize the lower acids in order to have the carboxyl groups constitute a large part of the molecule. Some representative carboxylic acids which can be used in the form of their alkali metal salts are, for example, acetic acid, propionic acid, butyric acid, valeric acid, caproic acid, isobutyric acid, isovaleric acid, isocaproic acid, acrylic acid, crotonic acid, 2-penten-oic acid, 3-buten-oic acid, maleic acid, fumaric acid, malonic acid, oxalic acid, succinic acid, glutaric acid, adipic acid, ethanetetracarboxylic acid, 1,2,3,4-butanetetracarboxylic acid, pivalic acid, etc. It is also possible to employ salts of aryl substituted aliphatic acids, e.g., salts of phenylacetic acid.

When a dicarboxylic acid or other polycarboxylic acid salt is utilized as the carboxylating agent, one or more of the carboxyl groups can be neutralized in the salt; however, it is ordinarily preferred that substantially all of the carboxyl groups be neutralized and in the alkali metal salt form.

Aromatic carboxylic acids are also useful as carboxylating agents and are, therefore, within the scope of the present invention. However, it will be recognized that the use of certain aromatic polcarboxylic acids involves another inventive aspect in that the aromatic carboxylic acids are themselves converted to terephthalic acid, while supplying carboxyl groups for the conversion of benzoic acid to terephthalic acid. Moreover, it did not necessarily follow that aromatic carboxylic acids would serve as carboxylating agents if aliphatic acids so served, nor that aliphatic-carboxylic acids would be carboxylating agents if aromatic-carboxylic acids were such agents; in this connection, it should be noted that carbon dioxide, potassium carbonate, etc. apparently do not function as carboxylating agents. The specific use of aromatic polycarboxylic acids as carboxylating agents in the preparation of terephthalic acids, particularly of trimellitate salts, is claimed in application S.N. 688,784 of Erhard J. Prill, filed of even date herewith.

In addition, it is obvious that the carboxyl-donating organic acid must be one other than benzoic acid, if the conversion of the benzoic acid is to be improved. Therefore, benzoic acid is not contemplated as the carboxyl-donating organic acid for use in the present process. It should also be observed that there will ordinarily be no great economic advantage in the use of aromatic carboxylic acids as the carboxy donor, unless the aromatic acids are themselves converted to terephthalic acid in substantial amount, or converted to some other useful product. Aromatic carboxylic acids, the salts of which are useful as carboxy donors in the conversion of benzoates to terephthalates, are, for example, trimellitic acid, pyromellitic acid, and trimesic acid.

Any of the foregoing or other carboxyl-donating organic acids for use in the present process can be admixed with each other, or with other such acids; and such mixtures are effective in the process.

While organic carboxylic acids of the specified type are useful in general in the present invention, it will be realized that some of them are much more effective or of greater practical value than others, particularly in view of the varying results obtained in the examples hereinabove.

The organic carboxylic acid salt will ordinarily be utilized in fairly substantial amounts in order to have sufficient carboxyl groups to carboxylate a substantial amount of the benzoate, for example, at least about 0.5 mole of the organic carboxylic acid salt for each mole of the benzoate salt; while there is no particular upper limit on the amount of organic carboxylic acid salt, it is not economically advantageous to use excessive amounts, e.g., amounts much greater than about 5 moles for each mole of benzoate salt. It is ordinarily preferred to utilize about 1 to about 3 moles of the organic carboxylic acid salt for each mole of the benzoate salt; of course, this will vary somewhat with the number and donatability of the carboxyl groups in the organic carboxylic acid salt.

The terephthalate salts produced by the reaction of the present invention can readily be converted to terephthalic acid by simple acidification. However, in isolating the terephthalic acid product from other reaction products, it is generally desirable to treat the reaction product with warm water, remove insolubles by filtration, and acidify the filtrate to obtain terephthalic acid.

For acidifying the terephthalate salts to terephthalic acid, any acid is suitable so long as it is a stronger acid than terephthalic acid or is capable of replacing the terephthalic acid from its salt under the acidification conditions, and so long as it does not react with or lead to undesirable contamination of the terephthalic acid product. Suitable acids are, for example, mineral acids such as nitric acid, hydrochloric acid, phosphoric acid, sulfuric acid, etc.; or organic acids, e.g., formic acid, acetic acid, and benzoic acid; or carbonic acid.

What is claimed is:

1. The preparation of terephthalic acid by the thermal reaction of alkali metal benzoates with alkali metal salts of aliphatic hydrocarbon carboxylic acids containing at least 2 carbon atoms, by heating the said components in a closed chamber in the presence of inert gas at temperatures from 350° C. to 500° C. to convert the benzoates to terephthalates the said aliphatic acid salt being present in amount of about 0.5 to 5 moles for each mole of said benzoate salt, and acidifying the terephthalates to obtain terephthalic acid.

2. The process of claim 1 in which more than 50% of the benzoate is actually converted to terephthalic acid.

3. The process of preparing terephthalic acid which comprises heating an alkali metal benzoate along with an alkali metal salt of aliphatic hydrocarbon carboxylic acid containing at least 2 carbon atoms in the presence of another material as catalyst selected from the group consisting of heavy metals, heavy metal salts, and heavy metal oxides in the presence of inert gas and at temperatures of 400° C. to 500° C. for a time sufficient to cause conversion of the benzoate to terephthalate, and acidifying to obtain terephthalic acid.

4. The method of claim 3 in which the organic carboxylic acid is an aliphatic acid of 2 to 6 carbon atoms and the inert gas is carbon dioxide.

5. The method of claim 4 in which the acid is acetic acid.

6. The method of claim 4 in which the acid is oxalic acid.

7. The method of preparing potassium terephthalate salts which comprises heating potassium benzoate and the potassium salt of an aliphatic hydrocarbon carboxylic acid containing at least two carbon atoms in a closed chamber at 350 to 450° C. under carbon dioxide pressure to convert the potassium benzoate to potassium terephthalate.

8. The method of claim 7 in which from 1 to 3 moles of the said potassium salt of an organic carboxylic acid are utilized for each mole of potassium benzoate, and in which a cadmium metal salt is used as catalyst.

9. The process of claim 1 in which at least some of the alkali metal component of the reactants has an atomic weight of at least 39.

10. The method of producing terephthalic acid which comprises heating potassium benzoate with an alkali metal salt of oxalic acid in the presence of a cadmium catalyst in an inert gas under superatmospheric pressure at temperatures above 300° C. but below the temperature of substantial decomposition of the potassium benzoate and the reaction products thereof, and converting the potassium terephthalate produced to terephthalic acid by acidification.

References Cited in the file of this patent

UNITED STATES PATENTS

| 2,794,830 | Raecke et al. | June 4, 1957 |
| 2,823,229 | Raecke | Feb. 11, 1958 |
| 2,823,230 | Raecke | Feb. 11, 1958 |

FOREIGN PATENTS

| B35,604 | Germany | Oct. 11, 1956 |
| 798,442 | Great Britain | July 23, 1958 |

UNITED STATES PATENT OFFICE

CERTIFICATE OF CORRECTION

Patent No. 3,096,366                                              July 2, 1963

Franklin D. Smith et al.

It is hereby certified that error appears in the above numbered patent requiring correction and that the said Letters Patent should read as corrected below.

Column 3, line 69, for "formation" read -- formate --.

Signed and sealed this 11th day of February 1964.

(SEAL)
Attest:
ERNEST W. SWIDER                                      EDWIN L. REYNOLDS Attesting Officer                                      Acting Commissioner of Patents